United States Patent [19]

Bartik

[11] 3,937,662
[45] Feb. 10, 1976

[54] MARINE DISCHARGE CONTROL APPARATUS AND METHOD FOR TREATING FLUIDS ON A MARINE VESSEL

[75] Inventor: Ivan Bartik, Cookeville, Tenn.
[73] Assignee: Keene Corporation, New York, N.Y.
[22] Filed: May 13, 1974
[21] Appl. No.: 469,401

[52] U.S. Cl. .................. 210/23; 210/73; 210/93; 210/96; 210/104
[51] Int. Cl.² ........................... B01D 29/36
[58] Field of Search ........ 210/96, 102, 104, DIG. 5, 210/93, 23, 73

[56] References Cited
UNITED STATES PATENTS

| | | |
|---|---|---|
| 3,253,711 | 5/1966 | Young .............................. 210/96 X |
| 3,565,252 | 2/1971 | Sheehy ............................. 210/104 |
| 3,738,492 | 6/1973 | Taillich ........................ 210/DIG. 5 |
| 3,797,666 | 3/1974 | Nakanishi et al. ............ 210/DIG. 5 |

*Primary Examiner*—John Adee
*Attorney, Agent, or Firm*—Albert L. Jeffers; Roger M. Rickert

[57] ABSTRACT

A method and apparatus for treating fluids on a marine vessel, especially bilge and ballast water, in which the fluid to be treated is passed through filtering and coalescing devices to bring about separation of the oil from the water, whereupon the oil is delivered to an oil tank and the water is discharged overboard. The purity of the discharged water is continuously monitored by a turbidity meter and the flow of the fluid through the system is controlled thereby so that the discharged water will meet all pollution standards.

11 Claims, 8 Drawing Figures

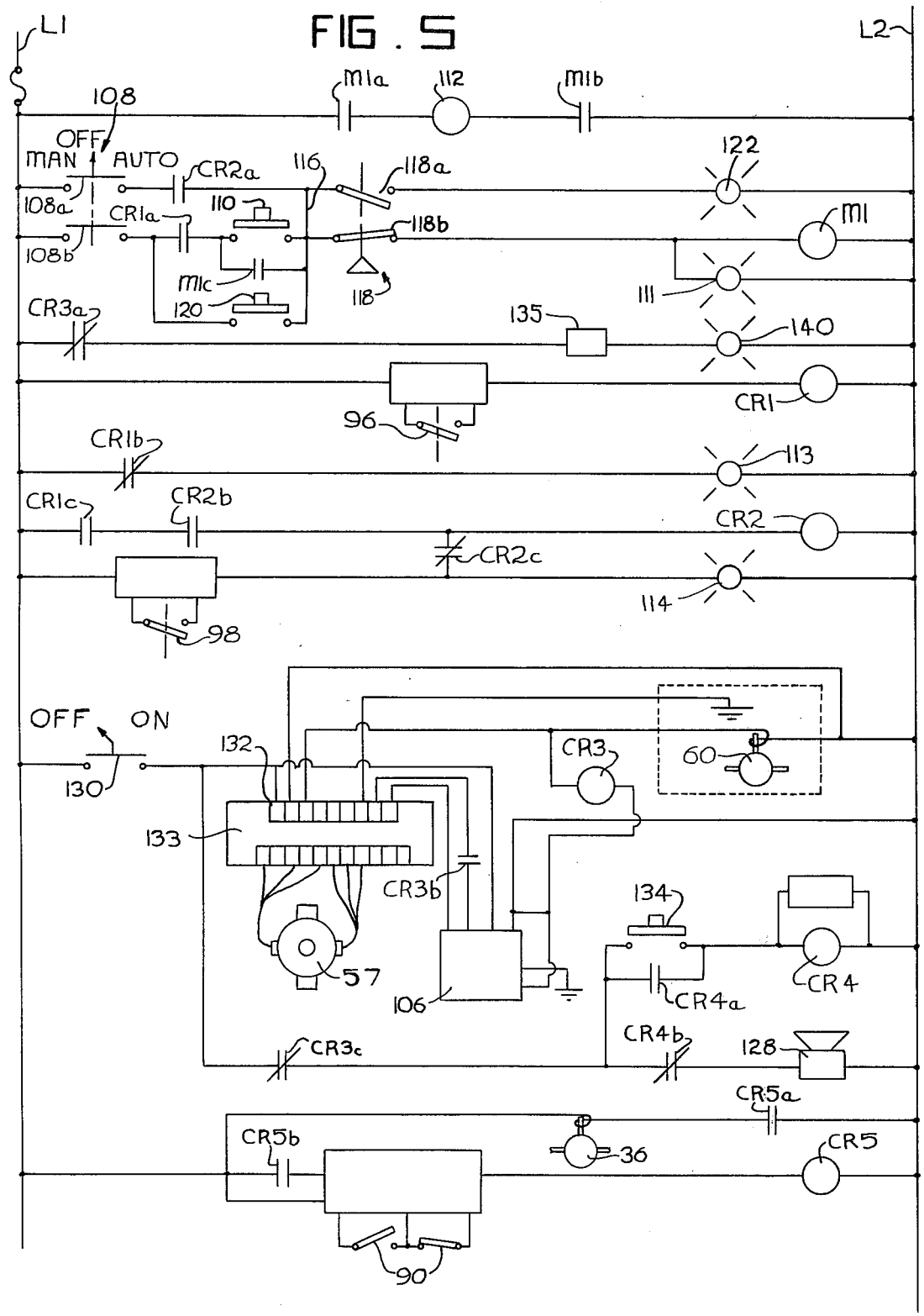

MARINE DISCHARGE CONTROL APPARATUS AND METHOD FOR TREATING FLUIDS ON A MARINE VESSEL

The present invention relates to a method and apparatus for treating fluids aboard a marine vessel and, in particular, for treating the fluid in the bilges and ballast tanks to separate oil therefrom and to clarify the water so that it can be discharged overboard.

It has always been a problem to dispose of the fluid in the bilges and ballast tanks of marine vessels because the fluid generally contains a great deal of entrained oil, fuel and other contaminants. The discharging of bilge fluid and ballast waters directly overboard is objectionable even in the open seas and is prohibited by the Federal Water Pollution Control Act and E.P.A. regulations in harbors, rivers, lakes, coastal areas, navigable waters and the like.

The penalties for unauthorized dumping of untreated bilge and ballast waters is extremely severe and a rather rigid set of rules has been established to clarify what can and cannot be dumped overboard from a vessel.

With the foregoing in mind, a primary objective of the present invention is the provision of a method and apparatus for treating bilge and ballast water on a vessel, especially to separate the oil from the water so that the water is sufficiently free of oil to permit the water to be discharged overboard.

Another object is the provision of a method and apparatus for treating bilge and ballast water in a marine vessel which operates automatically to clarify the water to the point that it can be discharged overboard without further treatment.

A still further object is the provision of a method and apparatus for treating bilge fluid and ballast water on a marine vessel which is automatic in operation and which continuously monitors the water to prevent water above a predetermined maximum turbidity for being discharged overboard.

A still further objective of the present invention is the provision of a method and apparatus for treating bilge fluids and ballast water which is extremely flexible and which can be installed in substantially any vessel.

BRIEF SUMMARY OF THE INVENTION

According to the present invention, bilge or ballast water is pumped and supplied to a plurality of filter units arranged in series. The filter units, which are of a special type, provide for coalescing of the admixed fluids in individual droplets of substantial size so that the oil and water conventionally making up the bilge and ballast fluid will have a strong tendency to separate by gravity.

The oil thus separated from the water is drawn off from the top of one or more of the units and delivered to an oil storage tank while the water runs sequentially through the filtering and coalescing units and yields up a fraction of the oil carried thereby in each unit and is discharged from the final one of the filtering and coalescing units as substantially oil-free water.

According to the present invention, the water from the last of the filtering and coalescing units is discharged overboard but immediately upon leaving the last one of the said units is caused to flow through a turbidity meter which senses the degree of purity of the water, namely, the amount of oil therein and diverts the water away from the discharge line when the turbidity of the water exceeds a predetermined allowable maximum.

Inasmuch as the bilge or ballast fluid is principally water, it would be apparent that the arrangement of the present invention provides for elimination of most of the bilge fluid by permitting discharge of the water from the vessel. The oil extracted from the bilge fluid is filtered sufficiently that it can be returned to the oil storage tanks for further use.

The objects referred to above as well as still other objects and advantages of the present invention will become more apparent upon reference to the following detailed specification taken in connection with the accompanying drawings in which:

FIG. 5 is a schematic electrical diagram showing one electrical circuit arrangement for controlling the system.

DETAILED DESCRIPTION OF THE INVENTION

Figure 1:
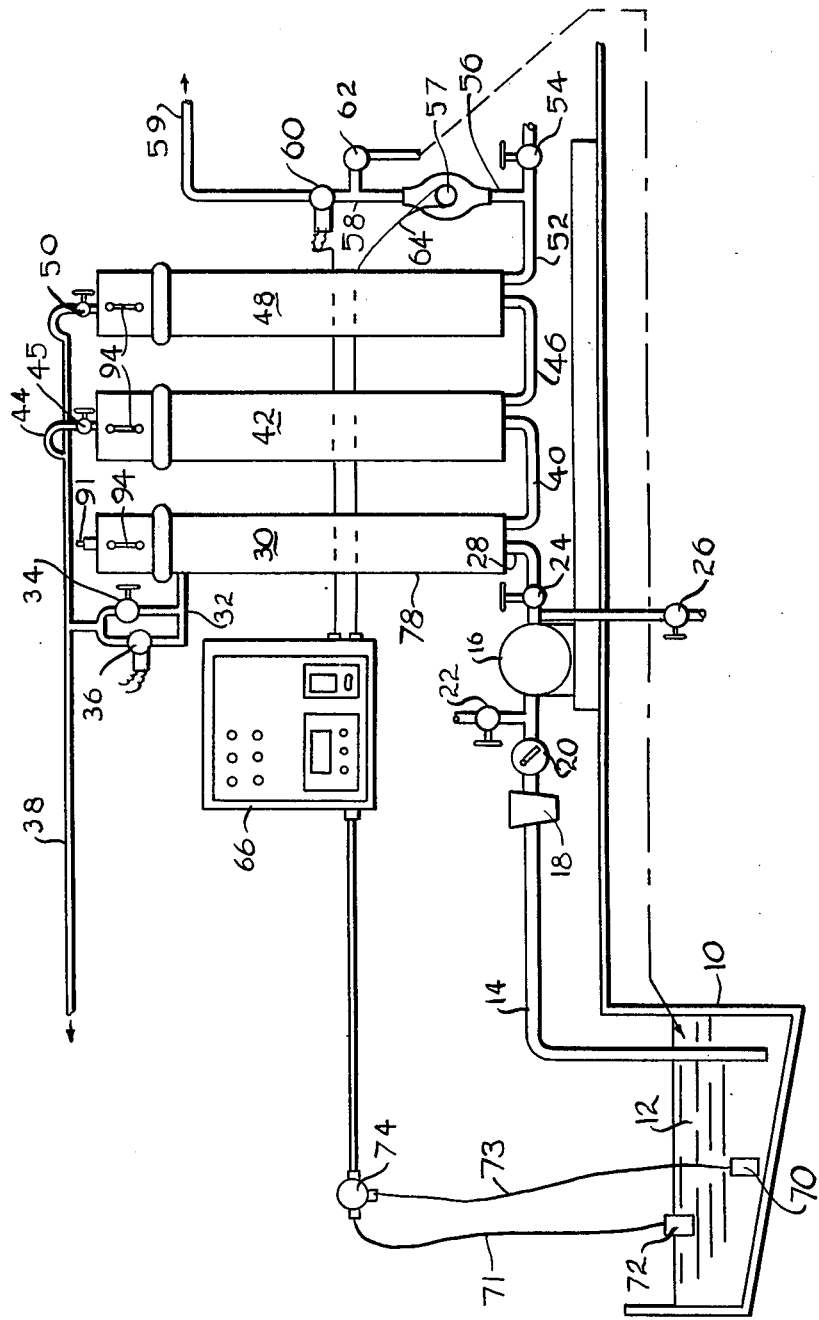
FIG. 1 is a somewhat schematic representation of a bilge or ballast water treatment system according to the present invention.

Referring to the drawings somewhat more in detail, the system schematically illustrated in FIG. 1 shows a bilge or ballast 10 containing bilge fluid 12. A suction conduit 14 extends downwardly to a lower level in the bilge or ballast tank and is connected to the inlet side of a motor driven pump 16 with a strainer 18, a check valve 20 and a priming water connection 22 associated with the conduit upstream from the pump inlet.

Pump 16 is advantageously a rather slow running, progressive cavity type, capable of handling relatively large solids without damage and causing a negligible amount of emulsification of the oil with the water when the fluid passes through the pump.

Downstream from the pump is a valve arrangement consisting of valves 24 and 26, or a like valve arrangement, so that when the bilges and ballast tanks are cleaned, the filtering and coalescing units can be bypassed thus preventing the surfactants and other active agents in the cleaning medium employed from interfering with the coalescing action that takes place in the filtering and coalescing units.

The discharge conduit leading from the pump, and indicated at 28, and downstream from valves 24 and 26, enters the bottom of a unit generally indicated at 30 and which is referred to as a pre-filter unit. This unit acts as an oil separator as well as a water filter and can be connected to the oil tank which receives the separated out oil.

Near the top of unit 30 there is connected a conduit 32 and in parallel in the conduit is a manual valve 34 and a solenoid operated valve 36. A sensor 91 (FIGS. 1 and 2) mounted in the upper end of unit 30 controls valve 36 to provide for oil flow therethrough to conduit 38 leading to an oil tank.

Leading from the bottom of unit 30 is a transfer conduit 40 which is connected to the inlet of a second unit generally indicated at 42 and which may be substantially identical with unit 30 except that the work operation performed in unit 42 is that of removing oil still contained in the water leaving unit 30.

To this end, unit 42 and the next following unit 48 are referred to as coalescer units because the principal function thereof is to coalesce the oil into droplets of substantial size which will rise in the water by gravitational action. The oil will, thus, rise in the unit toward the top thereof to be discharged therefrom to an oil conduit 38, or to another conduit (not shown) in the event separate oil discharge to storage is desired. Unit 42 has a manual valve 45 in the oil discharge line 44 which leads to conduit 38.

Transfer conduit 46, of unit 42, leads to the inlet of the final unit 48 which is another coalescer unit similar to or identical with unit 42. Manual valve 50 connects the oil discharge port at the top of unit 48 with oil conduit 38 while discharge conduit 52 leading from the bottom of unit 48 forms the water discharge conduit. Conduit 52 has a valve 54 connected thereto through which flushing water can be introduced into the system to flush out the filtering, coalescing units, or turbidity meter sensing head.

Between unit 48 and valve 54, a branch conduit 56 leads to the inlet of a turbidity meter sensing head 57, the outlet of which is connected by conduit 58 with exhaust, which in this case, is conduit 59 leading to the outside of the vessel. Conduit 58 contains a solenoid operated valve 60 and upstream therefrom is a relief valve 62.

The turbidity meter, which is not disclosed in detail, comprises the sensing head 57 illustrated and from which electrical connections are taken via wires or cable 64 to a control box 66. Within control box 66 is a turbidity meter which is operable, in a known manner, to control at least solenoid valve 60. A turbidity meter of a known type which can be employed in the system of the present invention is illustrated and described in detail in U.S. Pat. No. 3,510,666.

What the sensing head 57 does is to project direct and scattered light beams transversely through the fluid stream flowing therethrough while using photosensitive elements on the opposite side of the stream of fluid to receive the direct and scattered light passing through the stream. The amount of light received by the photosensitive element relative to the direct and scattered light emitted by the light source varies in conformity with the oil content of the water, namely, the turbidity thereof, and can be used as a measure of the amount of oil entrained in the water.

Whenever the turbidity exceeds a certain allowable maximum amount, valve 60 will close and prevent further discharge of fluid out of the vessel. At this time, the relief valve 62 becomes operative to discharge fluid back to the bilge or ballast containers 10 and signal lights will become illuminated which will inform the operator that adjustments must be made, such as flushing out of units or replacement of the filtering and coalescing elements and the like.

Within the bilge or ballast container 10 is a low level detector 70 and a high level detector 72. These detectors are connected through a level control assembly 74 to control box 66 and operate to start the system, namely, the pump 16, when the high level actuates detector 72 and to shut down the system, namely, stop the pump 16 when a predetermined minimum level is detected by detector 70.

Figure 2:
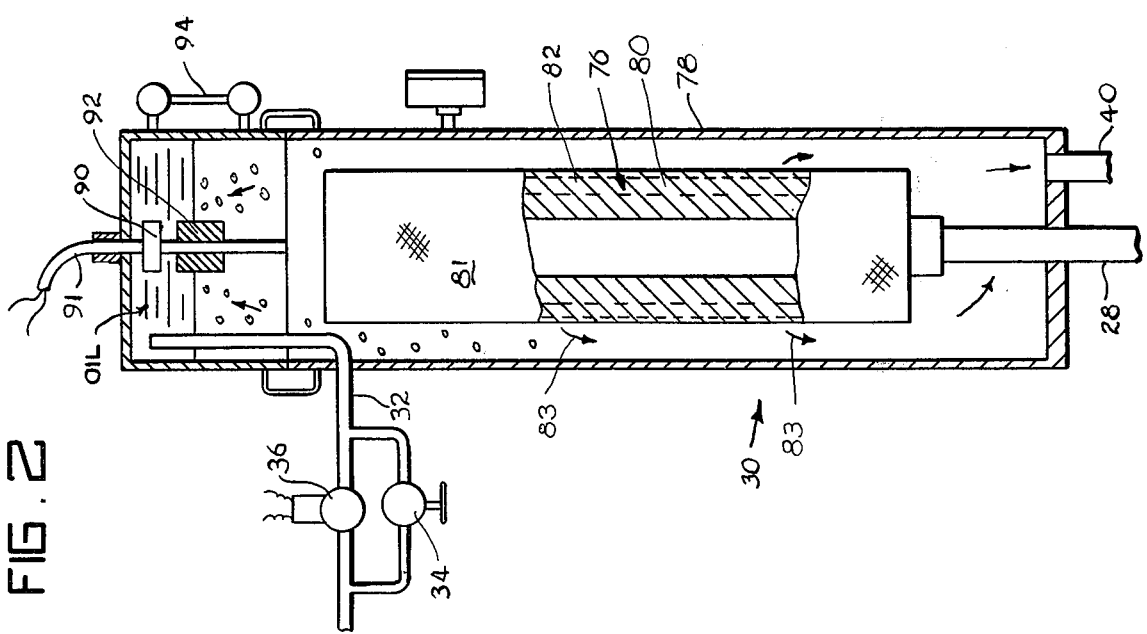
FIG. 2 is a vertical sectional view through one of the filtering and coalescing units of FIG. 1 and, specifically, the first one thereof to which the bilge or ballast fluid is supplied.

FIG. 2 shows in vertical section a typical filter and coalescer unit substantially of the nature of the units 30, 42 and 48 of FIG. 1. The particular unit illustrated in FIG. 2 is the first unit 30 of FIG. 1 but all of the units can have the same filtering element therein.

In FIG. 2, it will be noted that inlet conduit 28 communicates with the center of a vertically disposed cylindrical filter/coalescer element 76 while transfer conduit 40 communicates with the outside of the filter element. The filter element is smaller in diameter and shorter in axial length than the surrounding cylindrical housing 78.

The opposite ends of the filter/coalescer element 76 are closed so that fluid flow therethrough is radially outwardly. The filter element is provided with an inner filtering layer 80 which may be paper or other filtration media and surrounding which is one or more layers of a filter/coalescer media 82 which may consist, for example, of one or more layers of fiberglass or plastic media. Disposed outside the media is a retaining member or sleeve 81.

The filter/coalescer unit filters solid particles and the like from the fluid passing therethrough but, in particular, has the feature of coalescing the oil into droplets of substantial size which emerge from the outside of the surrounding sleeve member 81 and move upwardly in housing 78 toward the top. The water, on the other hand, tends to flow down (as indicated by the arrow 83) to the lower portion of the housing 78 where it is discharged through transfer conduit 40.

The conduit 32 referred to in FIG. 1 and forming the oil discharge conduit will be seen in FIG. 2 to extend up to the upper portion of the housing 78 so as to have the open end in that region where oil accumulates in the housing.

Since most of the oil is separated from the water in unit 30, it is advisable to employ a switch 90 operated by float 92 to control solenoid valve 36 so that the oil will be drained off as rapidly as it accumulates with the oil drain line being shut off when the oil gets down to a predetermined minimum amount. Switch 90 is connected into the control circuit by a cable 91 extending out the top of filter/coalescer unit 30.

In respect to units 42 and 48, the oil accumulation is considerably slower and the valves 45 and 50 can be manipulated in conformity with the indications of oil level in sight glass 94. A similar sight glass 94 is provided on unit 30 even though the extraction of oil therefrom is automatic.

Figure 3:
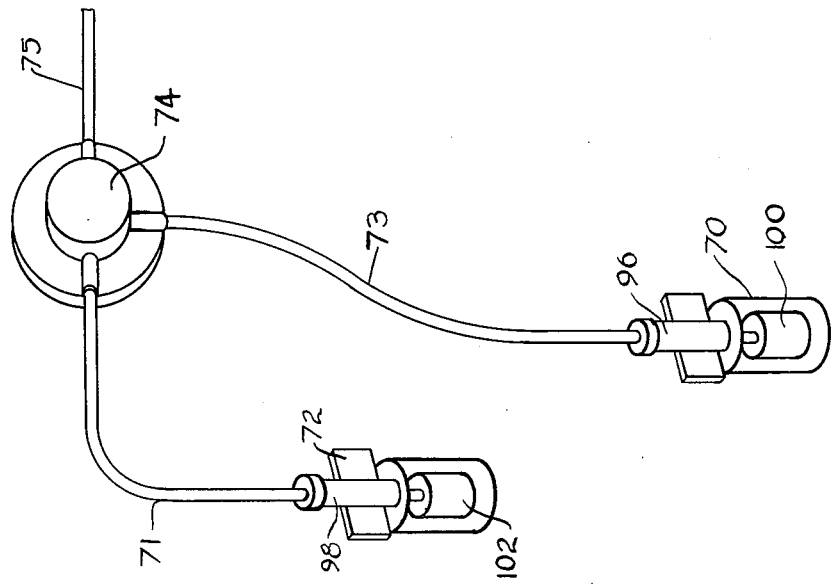
FIG. 3 is a perspective view showing the fluid level detectors which are mounted in the bilge or ballast tanks and operate in response to fluid level to control the starting and stopping of the system.

FIG. 3 shows the detectors 70 and 72. Each detector comprises a switch 96, 98, and each switch is under the control of a respective float 100, 102. Switch 96 remains closed until the liquid interface drops to a predetermined point whereas switch 98 closes when the liquid interface rises to a predetermined level.

The floats 100 and 102 are weighted for oil of maximum specific gravity of 0.9 and, therefore, they will float on water, but sink in oil of specific gravity 0.9 or less. The principle will allow for operation of the floats on the interface of the water-oil level and assure that the system will pump out the water, but not the oil, which will be left in the sumps for separate treatment.

The cables 71 and 73 leading from the switches are connected through the junction box 74 to the control box assembly 66 through cable 75.

Figure 4:
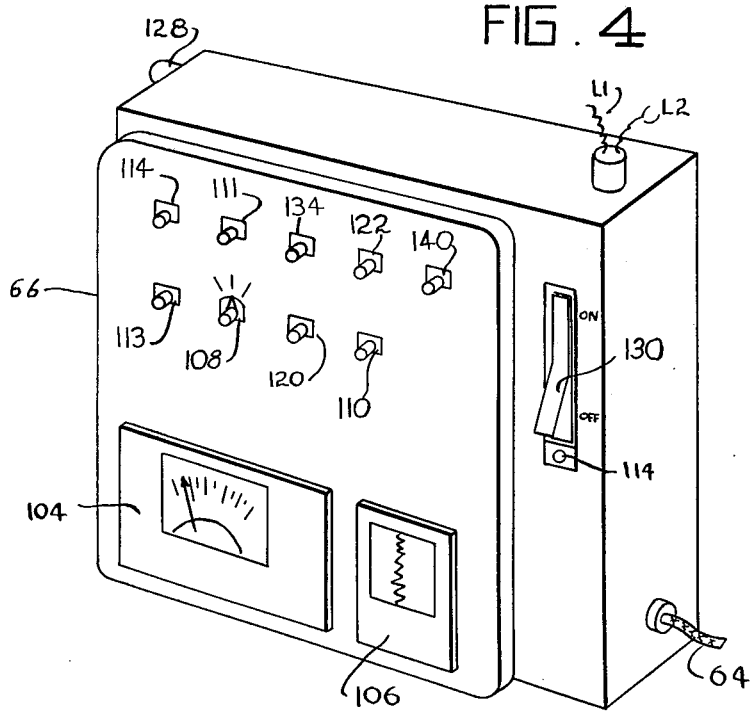
FIG. 4 is a perspective view of a central control box in which the operation of the entire system can be controlled.

FIG. 4 is a schematic view of the control box 66 showing the various signal lamps and switches thereon and also showing the indicating instrument 104 which is operated by the sensing head 57. A recorder generally indicated at 106 is also mounted in the control box and maintains a continuous record of the turbidity of the outgoing water whenever the system is running.

The several switches and signal lamps appearing in FIG. 4 are described in connection with the description of the control circuit of FIG. 5.

In FIG. 5, L1 and L2 indicates the main power lines. Power line L1 is connected to one side of a main switch 108 having "OFF", "manual", and "automatic" positions and having upper contacts 108a and lower contacts 108b. Line L1 is also connected through a low level detector switch 96 with the coil of a relay CR1, the other side of which is connected to line L2. Energization of CR1 will close contact CR1a connected between contact 108b and pushbutton switch 110. Energization of CR1 will also close contact CR1c in series with contact CR2b and the coil of a relay CR2 and will open contact CR1b in series with "bilge empty" lamp 113 which comes on when the bilge is pumped down.

Line L1 is also connected through normally open contact M1a through motor starter 112 for pump 16, and normally open contact M1b with line L2.

Line L1 is connected through a high level switch 98 and normally closed contact CR2c to one side of relay coil CR2, the other side of which is connected to line L2. A "bilge full" signal lamp 114 is connected between line L2 and switch 98 and lights when switch 98 closes.

Energization of the coil of relay CR2 will close contact CR2a connected between the upper contact 108a of switch 108 and a wire 116, and will also close its aforementioned contact CR2b and open aforementioned contact CR2c.

Wire 116 is connected to contact 118a of an overpressure switch 118, with contact 118a connected to one side of a signal lamp 122, the other side of which is connected to line L2.

Wire 116 is also connected to normally closed contact 118b of switch 118 with contact 118b connected to one side of relay coil M1, the other side of which is connected to line L2. Relay M1 controls contact M1a and M1b in series with pump motor starter 112, and a further contact M1c.

Aforementioned pushbutton switch 110 has one side connected to wire 116 and is bypassed by a normally open contact M1c of relay M1.

Still another pushbutton switch 120 has one side connected to wire 116 and the other side connected to the side of contact CR1a remote from switch 110.

When switch 108 is set on "automatic", closing of high level switch 98 will energize CR2 which will cause contact CR2a to close and energize relay M1 which will, in turn, bring about closing of contacts M1a and M1b to energize pump motor starter 112. At this time, contact CR1a is closed and contact M1c of relay M1 will establish a holding circuit for relay M1 which will remain effective until low level switch 96 opens to deenergize relay CR1 and cause its contact CR1a to open. Deenergizing of relay CR1 will open its contact CR1c and cause denergizing of relay CR2.

On "automatic", therefore, the motor for pump 16, and under the control of motor starter 112, starts and stops automatically. If system pressure rises above a certain limit, switch 118 is actuated to deenergize relay M1 while illuminating lamp 122. Lamp 111 in parallel with relay M1 illuminates when the relay is energized.

As to the prefilter 30, valve 36 thereof opens when oil in the prefilter accumulates a predetermined amount and closes when the oil is discharged. The solenoid of valve 36 is in series with a contact CR5a of a relay CR5 controlled by the float controlled switch means 90 of the prefilter with contact CR5b providing the holding circuit for the relay CR5.

As to control of the system by the turbidity sensing head 57, line L1 is connected through an OFF-ON switch 130 with a terminal block 132 and with one side of a normally closed contact CR3c of a relay CR3. When switch 130 is closed relay CR3 will be energized and will open its contacts CR3a and CR3c and close contacts CR3b, and CR3d.

Contact CR3b connects recorder 106 to the terminal block 132 to receive signals from amplifier 133 so that recording of turbidity is made while switch 130 is closed and the turbidity is within allowable limits.

If the turbidity exceeds the allowable limit, relay CR3 is deenergized to close contacts CR3a and CR3c while opening contact CR3b. Opening of contact CR3b will stop recording of the recorder. Simultaneously with deenergization of relay CR3, the solenoid of valve 60 is deenergized whereupon the valve closes and interrupts the discharge of treated bilge fluid from the vessel and, instead, the treated bilge fluid will bypass back to the bilge by way of valve 62.

Also, contact CR3a will close and a signal lamp 140 will commence to flash through flasher 135. Still further, contact CR3c will close and energize horn 128 via normally closed contact CR4b of relay CR4.

The horn can be silenced by depression of pushbutton switch 134 which will energize the coil of relay CR4. Contact CR4a of relay CR4 will provide a holding circuit for the relay when the relay is energized and contact CR4b will open and silence horn 128. Whenever proper operating conditions are reestablished, relay CR3 will again be energized, the contact CR3b closed thereby connecting recorder 106 to amplifier 133 while interrupting the circuit to horn 128 via contact CR3c. Lamp 140 will also be extinguished by opening contact CR3a when relay CR3 is again energized.

The system of the present invention is relatively simple to maintain in operation. Such maintenance might comprise the replacement of elements, or the cleaning out of the filters/coalescers as by backwashing with flushing water or it may consist of cleaning out the system upstream from pump 16. All of the maintenance functions are provided for by way of the valves that have previously been described.

Normally, the system will operate automatically, starting up when the fluid in the bilge reaches a certain upper level and shutting off when the fluid drops to a certain lower level. A continuous record is maintained of the turbidity of the discharged water and the system automatically recirculates the fluid when this turbidity exceeds an allowable maximum amount.

For manual operation of the pump 16, pushbutton 120 can be availed of. Switch 108 is set in the manual position to close lower contacts 108b thereof and switch 120 then becomes effective for energizing relay M1 whereby to close contacts M1a and M1b thereof to energize motor starter 112 for pump 16. Switch 120 is employed, for example, in pumping out the bilges for clean out operation. A further switch 110 is also provided for the control of motor starter 112 but is, in turn, under the control of contacts CR1a of relay CR1.

Figure 6:
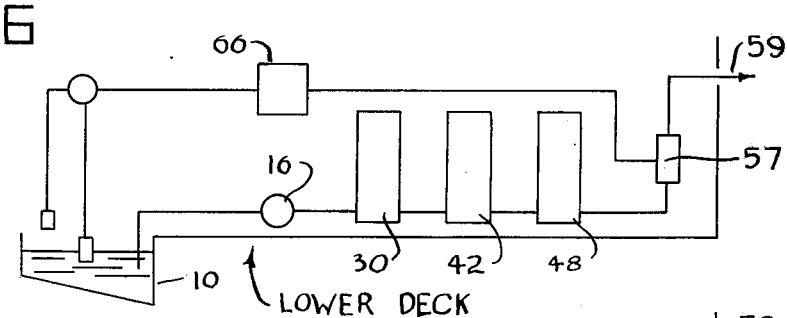
FIGS. 6, 7 and 8 are schematic views showing different arrangements that can be made of the system according to the present invention and demonstrate the flexibility thereof.
Figure 7:
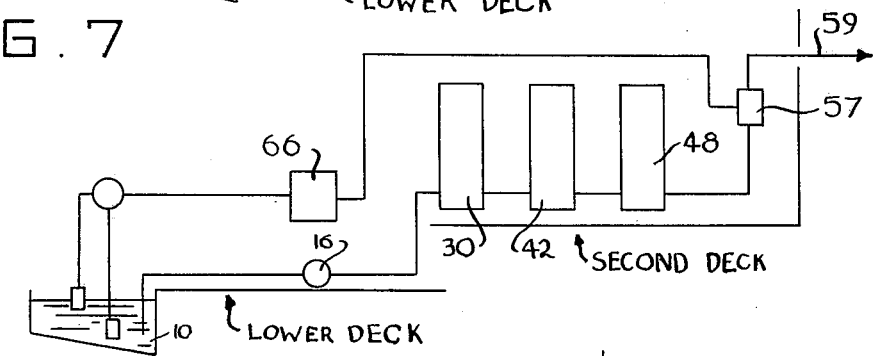
Figure 8:
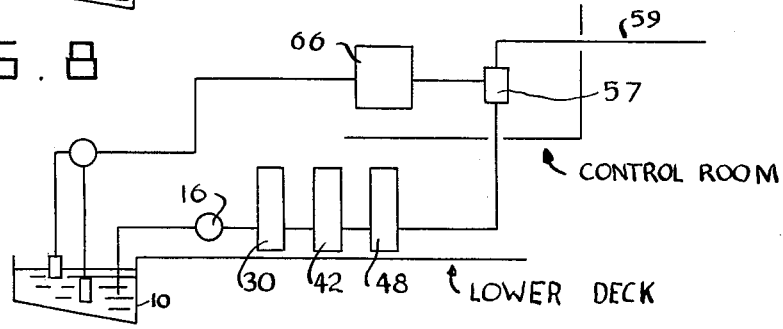

FIGS. 6, 7 and 8 show the flexibility of a modular type system according to the present invention. In FIG. 6, the pump 16 and the filtering and coalescing units are all mounted on the lower deck. Whereas, in FIG. 7, the pump 16 is mounted on the lower deck while the coalescing units and the turbidity sensing head 57 are mounted on a second deck.

In FIG. 8, the pump and filtering and coalescing units are mounted on the lower deck while the turbidity sensing head and the control box are mounted in a control room. It will be seen that many different physical arrangements could be made of the components of the present invention without in any way interfering with the operation thereof.

The system for treating bilge water as disclosed herein is compact and does not interfere with movement of personnel on the ship.

A typical installation will maintain a clean bilge on the ship purging at about 10 gallons per minute flow rate. The effluent from the system which is discharged overboard has about 98% of the solid particulate matter above 0.5 microns removed therefrom and the oil content reduced to about 2 or 3 parts per million where the influent ranges up to about 1000 parts per million of marine grade oils and fuels ranging in viscosity from about 30 to 3,000 SUS. Operating temperature of the system is within the range of about 30°F to about 150°F.

Modifications may be made within the scope of the appended claims.

What is claimed is:

1. In a system for treating bilge or ballast liquid on board a marine vessel to separate the oil therein from the water, said system comprising in combination, a filter/coalescing unit means having liquid inlet means, oil outlet means and water outlet means, said filter/coalescing unit means operable to separate and filter the oil and water flowing therethrough, a pump connected to supply liquid to be treated to said inlet means, said water outlet means including a turbidity meter operable to develop a signal in response to any oil that may be in the water, said turbidity meter operable to monitor the full flow of any water therein, and control means connected to said turbidity meter and responsive to said actuating signal for interrupting the flow of water through the water outlet means when oil of predetermined maximum is reached.

2. A system according to claim 1 in which said control means includes a shut off valve in said water discharge conduit downstream from said sensing means, and a relief valve in the said conduit between the sensing means and the shut off valve and connected to return the water to the bilge.

3. A system according to claim 1 which includes recording means actuated by said sensing means to maintain a continuous record of the quality of the water being discharged from the vessel.

4. A system according to claim 1 in which said filter/coalescing unit means includes a housing means, filter element means closed at one end and mounted in the said housing means, the inside of said filter element means communicating with said fluid inlet means, said fluid outlet means being connected to said housing means in the lower portion thereof and communicating with the outside of said filter element means, said oil outlet means connected to said housing means near the upper portion and communicating with the outside of said filter element means.

5. A system according to claim 4 in which said housing means comprises a number of separate housings, said filter element means comprising a filter/coalescer element in each housing, said inlet and outlet means comprising a fluid inlet and a fluid outlet and an oil outlet for each housing, said pump being connected to the fluid inlet of the first of said housings and said water outlet means being connected to the fluid outlet of the last of said housings, the fluid inlet of each housing following the first thereof being connected to the fluid outlet of the next preceding housing whereby the water in the fluid being treated flows through said filter/coalescer elements in series, each oil outlet being connected to said oil line whereby oil is withdrawn individually from said housings.

6. A system according to claim 1 in which the suction side of said pump is connected to a tank, level detectors in said tank for detecting upper and lower fluid interface therein, and a control system connected to and under the control of said detectors and operable to energize said pump when said upper liquid interface is detected and to deenergize said pump when said lower liquid interface is detected.

7. A system according to claim 6 which includes means for energizing said pump independently of said level detectors.

8. A system according to claim 6 which includes recording means for maintaining a record of the quality of the water flowing through said sensing means in said water discharge conduit, and means for making said recording means effective only when said pump is discharging water overboard.

9. A system according to claim 4 which includes valve means between said oil line and each of the oil outlets of each housing, a switch controlling the valve means pertaining to the oil outlet of at least one housing, and a float in said first housing sensitive to the amount of oil collected in the upper end thereof for controlling said switch.

10. The method of treating bilge or ballast liquid on a marine vessel to clarify the water content of the liquid to such a degree as to permit discharge thereof overboard the vessel, said method comprising; passing the bilge or ballast liquid through a plurality of filter/coalescer elements in series and causing the oil in the fluid to coalesce into droplets of substantial size on the discharge side of each filter/coalescer element, withdrawing oil from the discharge side of each filter/coalescer element, continuously measuring the turbidity of the full flow of water discharged from the last filter/coalescer element, and interrupting the discharge of water overboard the vessel when the measured turbidity exceeds a predetermined amount.

11. The method of treating bilge or ballast liquid on a marine vessel to clarify the water content of the liquid to such a degree as to permit discharge thereof overboard the vessel, said method comprising; passing the bilge liquid radially outwardly through a plurality of independently housed filtering and coalescing elements in series, permitting the oil which coalesces in each element to rise in the respective housing while the remainder of the fluid being treated flows downwardly therein, withdrawing oil from the upper portion of each housing while withdrawing fully treated water from the lower portion of the last housing, continuously measuring the turbidity of the full flow of the withdrawn treated water, and interrupting the discharge of the treated water overboard when the measured turbidity thereof exceeds a predetermined maximum.

* * * * *